(12) United States Patent
Arilla et al.

(10) Patent No.: US 11,334,750 B2
(45) Date of Patent: May 17, 2022

(54) USING ATTRIBUTES FOR PREDICTING IMAGERY PERFORMANCE

(71) Applicant: Monotype Imaging Inc., Woburn, MA (US)

(72) Inventors: Luis Sanz Arilla, New York, NY (US); Esteban Raul Siravegna, Córdoba (AR); Emanuele Luzio, Cordoba (AR)

(73) Assignee: Monotype Imaging Inc., Woburn, MA (US)

( * ) Notice: Subject to any disclaimer, the term of this patent is extended or adjusted under 35 U.S.C. 154(b) by 0 days.

(21) Appl. No.: 15/698,255

(22) Filed: Sep. 7, 2017

(65) Prior Publication Data

US 2019/0073537 A1 Mar. 7, 2019

(51) Int. Cl.
| | |
|---|---|
| *G06K 9/62* | (2006.01) |
| *G06K 9/00* | (2022.01) |
| *G06Q 50/00* | (2012.01) |
| *G06N 20/00* | (2019.01) |
| *G06F 16/51* | (2019.01) |
| *G06F 16/58* | (2019.01) |
| *G06Q 30/02* | (2012.01) |

(52) U.S. Cl.
CPC ......... *G06K 9/00684* (2013.01); *G06F 16/51* (2019.01); *G06F 16/58* (2019.01); *G06N 20/00* (2019.01); *G06Q 30/02* (2013.01); *G06Q 30/0276* (2013.01); *G06Q 50/01* (2013.01)

(58) Field of Classification Search
CPC ............ G06K 9/00684; G06Q 30/0276; G06F 16/58; G06N 20/00
See application file for complete search history.

(56) References Cited

U.S. PATENT DOCUMENTS

| | | | |
|---|---|---|---|
| 4,244,657 A | 1/1981 | Wasylyk | |
| 4,998,210 A | 3/1991 | Kadono et al. | |
| 5,263,132 A | 11/1993 | Parker et al. | |
| 5,347,266 A | 9/1994 | Bauman et al. | |

(Continued)

FOREIGN PATENT DOCUMENTS

| | | |
|---|---|---|
| EP | 0949574 | 10/1999 |
| EP | 2166488 A2 | 3/2010 |

(Continued)

OTHER PUBLICATIONS

European Search Report in European Application No. 18193233.6, dated Nov. 11, 2018, 8 pages.

(Continued)

*Primary Examiner* — Solomon G Bezuayehu
(74) *Attorney, Agent, or Firm* — Procopio, Cory, Hargreaves & Savitch LLP

(57) ABSTRACT

A system includes a computing device that includes a memory configured to store instructions. The system also includes a processor to execute the instructions to perform operations that include determining a ranking of images using a machine learning system. The machine learning system is trained using attributes that represent each of a plurality of training images. The attributes include imagery attributes, social network attributes, and textual attributes. Operations also include producing a listing of the ranked images for selecting one or more of the ranked images for a brand entity associated with the selected ranked images.

33 Claims, 10 Drawing Sheets

(56) References Cited

U.S. PATENT DOCUMENTS

| | | |
|---|---|---|
| 5,412,771 A | 5/1995 | Fenwick |
| 5,416,898 A | 5/1995 | Opstad et al. |
| 5,444,829 A | 8/1995 | Kawabata et al. |
| 5,453,938 A | 9/1995 | Gohara et al. |
| 5,526,477 A | 6/1996 | McConnell et al. |
| 5,528,742 A | 6/1996 | Moore et al. |
| 5,533,174 A | 7/1996 | Flowers et al. |
| 5,586,242 A | 12/1996 | McQueen et al. |
| 5,606,649 A | 2/1997 | Tai |
| 5,619,721 A | 4/1997 | Maruko |
| 5,630,028 A | 5/1997 | DeMeo |
| 5,737,599 A | 4/1998 | Rowe et al. |
| 5,748,975 A | 5/1998 | Van De Vanter |
| 5,757,384 A | 5/1998 | Ikeda |
| 5,761,395 A | 6/1998 | Miyazaki et al. |
| 5,781,714 A | 7/1998 | Collins et al. |
| 5,877,776 A | 3/1999 | Beaman et al. |
| 5,926,189 A | 7/1999 | Beaman et al. |
| 5,940,581 A | 8/1999 | Lipton |
| 5,995,718 A | 11/1999 | Hiraike |
| 6,012,071 A | 1/2000 | Krishna et al. |
| 6,016,142 A | 1/2000 | Chang |
| 6,031,549 A | 2/2000 | Hayes-Roth |
| 6,044,205 A | 3/2000 | Reed et al. |
| 6,065,008 A | 5/2000 | Simon et al. |
| 6,073,147 A | 6/2000 | Chan et al. |
| 6,111,654 A | 8/2000 | Cartier |
| 6,141,002 A | 10/2000 | Kanungo et al. |
| 6,167,441 A | 12/2000 | Himmel |
| 6,249,908 B1 | 6/2001 | Stamm |
| 6,252,671 B1 | 6/2001 | Peng et al. |
| 6,282,327 B1 | 8/2001 | Betrisey |
| 6,313,920 B1 | 11/2001 | Dresevic et al. |
| 6,320,587 B1 | 11/2001 | Funyu |
| 6,323,864 B1 | 11/2001 | Kaul et al. |
| 6,330,577 B1 | 12/2001 | Kim |
| 6,343,301 B1 | 1/2002 | Halt et al. |
| 6,426,751 B1 | 7/2002 | Patel |
| 6,490,051 B1 | 12/2002 | Nguyen et al. |
| 6,512,531 B1 | 1/2003 | Gartland |
| 6,522,330 B2 | 2/2003 | Kobayashi |
| 6,522,347 B1 | 2/2003 | Tsuji |
| 6,583,789 B1 | 6/2003 | Carlson et al. |
| 6,601,009 B2 | 7/2003 | Florschuetz |
| 6,657,625 B1 | 12/2003 | Chik et al. |
| 6,675,358 B1 | 1/2004 | Kido |
| 6,678,688 B1 | 1/2004 | Unruh |
| 6,687,879 B1 | 2/2004 | Teshima |
| 6,704,116 B1 | 3/2004 | Abulhab |
| 6,704,648 B1 | 3/2004 | Naik et al. |
| 6,718,519 B1 | 4/2004 | Taieb |
| 6,738,526 B1 | 5/2004 | Betrisey |
| 6,754,875 B1 | 6/2004 | Paradies |
| 6,760,029 B1 | 7/2004 | Phinney et al. |
| 6,771,267 B1 | 8/2004 | Muller |
| 6,810,504 B2 | 10/2004 | Cooper et al. |
| 6,813,747 B1 | 11/2004 | Taieb |
| 6,853,980 B1 | 2/2005 | Ying et al. |
| 6,856,317 B2 | 2/2005 | Konsella et al. |
| 6,882,344 B1 | 4/2005 | Hayes et al. |
| 6,901,427 B2 | 5/2005 | Teshima |
| 6,907,444 B2 | 6/2005 | Narasimhan et al. |
| 6,952,210 B1 | 10/2005 | Renner et al. |
| 6,992,671 B1 | 1/2006 | Corona |
| 6,993,538 B2 | 1/2006 | Gray |
| 7,050,079 B1 | 5/2006 | Estrada et al. |
| 7,064,757 B1 | 6/2006 | Opstad et al. |
| 7,064,758 B2 | 6/2006 | Chik et al. |
| 7,155,672 B1 | 12/2006 | Adler et al. |
| 7,184,046 B1 | 2/2007 | Hawkins |
| 7,188,313 B2 | 3/2007 | Hughes et al. |
| 7,228,501 B2 | 6/2007 | Brown et al. |
| 7,231,602 B1 | 6/2007 | Truelove et al. |
| 7,346,845 B2 | 3/2008 | Teshima et al. |
| 7,373,140 B1 | 5/2008 | Matsumoto |
| 7,477,988 B2 | 1/2009 | Dorum |
| 7,492,365 B2 | 2/2009 | Corbin et al. |
| 7,505,040 B2 | 3/2009 | Stamm et al. |
| 7,539,939 B1 | 5/2009 | Schomer |
| 7,552,008 B2 | 6/2009 | Newstrom et al. |
| 7,580,038 B2 | 8/2009 | Chik et al. |
| 7,583,397 B2 | 9/2009 | Smith |
| 7,636,885 B2 | 12/2009 | Merz et al. |
| 7,701,458 B2 | 4/2010 | Sahuc et al. |
| 7,735,020 B2 | 6/2010 | Chaudhri |
| 7,752,222 B1 | 7/2010 | Cierniak |
| 7,768,513 B2 | 8/2010 | Klassen |
| 7,836,094 B2 | 11/2010 | Ornstein et al. |
| 7,882,432 B2 | 2/2011 | Nishikawa et al. |
| 7,937,658 B1 | 5/2011 | Lunde |
| 7,944,447 B2 | 5/2011 | Clegg et al. |
| 7,958,448 B2 | 6/2011 | Fattic et al. |
| 7,987,244 B1 | 7/2011 | Lewis et al. |
| 8,098,250 B2 | 1/2012 | Clegg et al. |
| 8,116,791 B2 | 2/2012 | Agiv |
| 8,201,088 B2 | 6/2012 | Levantovsky et al. |
| 8,201,093 B2 | 6/2012 | Tuli |
| 8,306,356 B1 | 11/2012 | Bever |
| 8,381,115 B2 | 2/2013 | Tranchant et al. |
| 8,413,051 B2 | 4/2013 | Bacus et al. |
| 8,464,318 B1 | 6/2013 | Hallak |
| 8,601,374 B2 | 12/2013 | Parham |
| 8,643,542 B2 | 2/2014 | Wendel |
| 8,643,652 B2 | 2/2014 | Kaplan |
| 8,644,810 B1 | 2/2014 | Boyle |
| 8,689,101 B2 | 4/2014 | Fux et al. |
| 8,707,208 B2 | 4/2014 | DiCamillo |
| 8,731,905 B1 | 5/2014 | Tsang |
| 9,063,682 B1 | 6/2015 | Bradshaw |
| 9,317,777 B2 | 4/2016 | Kaasila et al. |
| 9,319,444 B2 | 4/2016 | Levantovsky |
| 9,432,671 B2 | 8/2016 | Campanelli et al. |
| 9,449,126 B1 | 9/2016 | Genoni |
| 9,483,445 B1 | 11/2016 | Joshi et al. |
| 9,569,865 B2 | 2/2017 | Kaasila et al. |
| 9,576,196 B1* | 2/2017 | Natarajan ............ G06K 9/3258 |
| 9,626,337 B2 | 4/2017 | Kaasila et al. |
| 9,691,169 B2 | 6/2017 | Kaasila et al. |
| 9,805,288 B2 | 10/2017 | Kaasila et al. |
| 9,817,615 B2 | 11/2017 | Seguin et al. |
| 10,007,863 B1* | 6/2018 | Pereira ................ G06K 9/6267 |
| 10,115,215 B2 | 10/2018 | Matteson et al. |
| 10,140,261 B2 | 11/2018 | Yang |
| 10,157,332 B1 | 12/2018 | Gray |
| 10,733,529 B1* | 8/2020 | Tran ................. H04L 51/04 |
| 10,867,241 B1* | 12/2020 | Rogers ................ H04L 67/42 |
| 2001/0021937 A1 | 9/2001 | Cicchitelli et al. |
| 2001/0052901 A1 | 12/2001 | Kawabata et al. |
| 2002/0010725 A1 | 1/2002 | Mo |
| 2002/0029232 A1 | 3/2002 | Bobrow et al. |
| 2002/0033824 A1 | 3/2002 | Stamm |
| 2002/0052916 A1 | 5/2002 | Kloba et al. |
| 2002/0057853 A1 | 5/2002 | Usami |
| 2002/0059344 A1 | 5/2002 | Britton et al. |
| 2002/0087702 A1 | 7/2002 | Mori |
| 2002/0093506 A1 | 7/2002 | Hobson |
| 2002/0120721 A1 | 8/2002 | Eilers et al. |
| 2002/0122594 A1 | 9/2002 | Goldberg et al. |
| 2002/0174186 A1 | 11/2002 | Hashimoto et al. |
| 2002/0194261 A1 | 12/2002 | Teshima |
| 2003/0014545 A1 | 1/2003 | Broussard et al. |
| 2003/0076350 A1 | 4/2003 | Vu |
| 2003/0197698 A1 | 10/2003 | Perry et al. |
| 2004/0025118 A1 | 2/2004 | Renner |
| 2004/0088657 A1 | 5/2004 | Brown et al. |
| 2004/0119714 A1 | 6/2004 | Everett et al. |
| 2004/0177056 A1 | 9/2004 | Davis et al. |
| 2004/0189643 A1 | 9/2004 | Frisken et al. |
| 2004/0207627 A1 | 10/2004 | Konsella et al. |
| 2004/0233198 A1 | 11/2004 | Kubo |
| 2005/0015307 A1 | 1/2005 | Simpson et al. |
| 2005/0033814 A1 | 2/2005 | Ota |
| 2005/0094173 A1 | 5/2005 | Engelman et al. |
| 2005/0111045 A1 | 5/2005 | Imai |

(56) References Cited

U.S. PATENT DOCUMENTS

| | | |
|---|---|---|
| 2005/0128508 A1 | 6/2005 | Greef et al. |
| 2005/0149942 A1 | 7/2005 | Venkatraman |
| 2005/0190186 A1 | 9/2005 | Klassen |
| 2005/0193336 A1 | 9/2005 | Fux et al. |
| 2005/0200871 A1 | 9/2005 | Miyata |
| 2005/0264570 A1 | 12/2005 | Stamm |
| 2005/0270553 A1 | 12/2005 | Kawara |
| 2005/0275656 A1 | 12/2005 | Corbin et al. |
| 2006/0010371 A1 | 1/2006 | Shur et al. |
| 2006/0017731 A1 | 1/2006 | Matskewich et al. |
| 2006/0061790 A1 | 3/2006 | Miura |
| 2006/0072136 A1 | 4/2006 | Hodder et al. |
| 2006/0072137 A1 | 4/2006 | Nishikawa et al. |
| 2006/0072162 A1 | 4/2006 | Nakamura |
| 2006/0103653 A1 | 5/2006 | Chik et al. |
| 2006/0103654 A1 | 5/2006 | Chik et al. |
| 2006/0168639 A1 | 7/2006 | Gan |
| 2006/0241861 A1 | 10/2006 | Takashima |
| 2006/0245727 A1 | 11/2006 | Nakano et al. |
| 2006/0253395 A1 | 11/2006 | Corbell |
| 2006/0267986 A1 | 11/2006 | Bae et al. |
| 2006/0269137 A1 | 11/2006 | Evans |
| 2006/0285138 A1 | 12/2006 | Merz et al. |
| 2007/0002016 A1 | 1/2007 | Cho et al. |
| 2007/0006076 A1 | 1/2007 | Cheng |
| 2007/0008309 A1 | 1/2007 | Sahuc et al. |
| 2007/0024626 A1 | 2/2007 | Kagle et al. |
| 2007/0050419 A1 | 3/2007 | Weyl et al. |
| 2007/0055931 A1 | 3/2007 | Zaima |
| 2007/0139412 A1 | 6/2007 | Stamm |
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1 | 9/2007 | Engleman et al. |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0115046 A1 | 5/2008 | Yamaguchi |
| 2008/0118151 A1 | 5/2008 | Bouguet et al. |
| 2008/0154911 A1 | 6/2008 | Cheng |
| 2008/0222734 A1 | 9/2008 | Redlich et al. |
| 2008/0243837 A1 | 10/2008 | Davis |
| 2008/0282186 A1 | 11/2008 | Basavaraju |
| 2008/0303822 A1 | 12/2008 | Taylor |
| 2008/0306916 A1 | 12/2008 | Gonzalez et al. |
| 2009/0031220 A1 | 1/2009 | Tranchant |
| 2009/0037492 A1 | 2/2009 | Baitalmal et al. |
| 2009/0037523 A1 | 2/2009 | Kolke et al. |
| 2009/0063964 A1 | 3/2009 | Huang |
| 2009/0070128 A1 | 3/2009 | McCauley et al. |
| 2009/0097049 A1 | 4/2009 | Cho |
| 2009/0100074 A1 | 4/2009 | Joung et al. |
| 2009/0119678 A1 | 5/2009 | Shih |
| 2009/0158134 A1 | 6/2009 | Wang |
| 2009/0171766 A1 | 7/2009 | Schiff et al. |
| 2009/0183069 A1 | 7/2009 | Duggan et al. |
| 2009/0275351 A1 | 11/2009 | Jeung et al. |
| 2009/0287998 A1 | 11/2009 | Kalra |
| 2009/0290813 A1 | 11/2009 | He |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0066763 A1 | 3/2010 | MacDougall |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1 | 10/2010 | DiCamillo |
| 2010/0321393 A1 | 12/2010 | Levantovsky |
| 2011/0029103 A1 | 2/2011 | Mann et al. |
| 2011/0032074 A1 | 2/2011 | Novack et al. |
| 2011/0090229 A1 | 4/2011 | Bacus et al. |
| 2011/0090230 A1 | 4/2011 | Bacus et al. |
| 2011/0093565 A1 | 4/2011 | Bacus et al. |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0203000 A1 | 8/2011 | Bacus et al. |
| 2011/0238495 A1 | 9/2011 | Kang |
| 2011/0258535 A1 | 10/2011 | Adler, III et al. |
| 2011/0271180 A1 | 11/2011 | Lee |
| 2011/0276872 A1 | 11/2011 | Kataria |
| 2011/0289407 A1 | 11/2011 | Naik |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1 | 2/2012 | Perronnin et al. |
| 2012/0066590 A1 | 3/2012 | Harris et al. |
| 2012/0072978 A1 | 3/2012 | DeLuca et al. |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0134590 A1 | 5/2012 | Petrou |
| 2012/0215640 A1 | 8/2012 | Ramer et al. |
| 2012/0269425 A1* | 10/2012 | Marchesotti ............ G06K 9/036 382/159 |
| 2012/0288190 A1 | 11/2012 | Tang |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1 | 2/2013 | Linnerud et al. |
| 2013/0067319 A1 | 3/2013 | Olszewski et al. |
| 2013/0120396 A1 | 5/2013 | Kaplan |
| 2013/0127872 A1 | 5/2013 | Kaplan |
| 2013/0156302 A1 | 6/2013 | Rodriguez Serrano et al. |
| 2013/0163027 A1 | 6/2013 | Shustef |
| 2013/0179761 A1 | 7/2013 | Cho |
| 2013/0185028 A1 | 7/2013 | Sullivan |
| 2013/0215126 A1 | 8/2013 | Roberts |
| 2013/0215133 A1 | 8/2013 | Gould et al. |
| 2013/0321617 A1 | 12/2013 | Lehmann |
| 2013/0326348 A1 | 12/2013 | Ip et al. |
| 2014/0025756 A1 | 1/2014 | Kamens |
| 2014/0047329 A1 | 2/2014 | Levantovsky et al. |
| 2014/0052801 A1 | 2/2014 | Zuo et al. |
| 2014/0059054 A1* | 2/2014 | Liu ........................ G06F 16/36 707/742 |
| 2014/0089348 A1 | 3/2014 | Vollmert |
| 2014/0136957 A1 | 5/2014 | Kaasila et al. |
| 2014/0153012 A1 | 6/2014 | Seguin |
| 2014/0176563 A1 | 6/2014 | Kaasila et al. |
| 2014/0195903 A1 | 7/2014 | Kaasila et al. |
| 2014/0279039 A1* | 9/2014 | Systrom ............ G06Q 30/0224 705/14.66 |
| 2014/0282055 A1 | 9/2014 | Engel et al. |
| 2014/0358802 A1 | 12/2014 | Biswas |
| 2015/0020212 A1 | 1/2015 | Demaree |
| 2015/0030238 A1 | 1/2015 | Yang et al. |
| 2015/0036919 A1 | 2/2015 | Bourdev et al. |
| 2015/0055855 A1* | 2/2015 | Rodriguez ............ G06K 9/627 382/159 |
| 2015/0062140 A1 | 3/2015 | Levantovsky et al. |
| 2015/0074522 A1 | 3/2015 | Hamed, III et al. |
| 2015/0097842 A1 | 4/2015 | Kaasila et al. |
| 2015/0100882 A1 | 4/2015 | Severenuk |
| 2015/0154002 A1 | 6/2015 | Weinstein et al. |
| 2015/0178476 A1 | 6/2015 | Horton |
| 2015/0193386 A1 | 7/2015 | Wurtz |
| 2015/0220494 A1 | 8/2015 | Qin et al. |
| 2015/0278167 A1 | 10/2015 | Arnold et al. |
| 2015/0339273 A1 | 11/2015 | Yang et al. |
| 2015/0339276 A1 | 11/2015 | Bloem et al. |
| 2015/0339543 A1 | 11/2015 | Campanelli et al. |
| 2015/0348297 A1 | 12/2015 | Kaasila et al. |
| 2016/0078656 A1 | 3/2016 | Borson et al. |
| 2016/0092439 A1 | 3/2016 | Ichimi |
| 2016/0140952 A1 | 5/2016 | Graham |
| 2016/0170940 A1 | 6/2016 | Levantovsky |
| 2016/0171343 A1 | 6/2016 | Kaasila et al. |

(56) References Cited

U.S. PATENT DOCUMENTS

| | | | |
|---|---|---|---|
| 2016/0182606 | A1 | 6/2016 | Kaasila et al. |
| 2016/0246762 | A1 | 8/2016 | Eaton |
| 2016/0307156 | A1 | 10/2016 | Burner |
| 2016/0307347 | A1 | 10/2016 | Matteson et al. |
| 2016/0314377 | A1 | 10/2016 | Vieira et al. |
| 2016/0321217 | A1 | 11/2016 | Ikemoto et al. |
| 2016/0344828 | A1* | 11/2016 | Hausler .................. H04L 67/42 |
| 2016/0371232 | A1 | 12/2016 | Ellis et al. |
| 2017/0017778 | A1 | 1/2017 | Ford et al. |
| 2017/0024641 | A1 | 1/2017 | Wierzynski |
| 2017/0098138 | A1 | 4/2017 | Wang et al. |
| 2017/0124503 | A1* | 5/2017 | Bastide ............ G06Q 10/06398 |
| 2017/0237723 | A1 | 8/2017 | Gupta et al. |
| 2017/0357877 | A1* | 12/2017 | Lin ................... G06K 9/00228 |
| 2018/0039605 | A1 | 2/2018 | Pao et al. |
| 2018/0075455 | A1 | 3/2018 | Kumnick et al. |
| 2018/0082156 | A1 | 3/2018 | Jin et al. |
| 2018/0097763 | A1* | 4/2018 | Garcia .................... H04L 67/22 |
| 2018/0109368 | A1* | 4/2018 | Johnson ............. H04L 65/1033 |
| 2018/0144256 | A1* | 5/2018 | Saxena .................. G06N 20/00 |
| 2018/0203851 | A1* | 7/2018 | Wu ......................... G06N 3/006 |
| 2018/0253988 | A1* | 9/2018 | Kanayama ............... G09B 5/06 |
| 2018/0285696 | A1* | 10/2018 | Eigen ...................... G06T 11/60 |
| 2018/0285965 | A1 | 10/2018 | Kaasila et al. |
| 2018/0332140 | A1 | 11/2018 | Bullock |
| 2018/0341907 | A1* | 11/2018 | Tucker ................ G06Q 30/0623 |
| 2018/0373921 | A1* | 12/2018 | Di Carlo ................ G06F 17/27 |
| 2019/0019087 | A1* | 1/2019 | Fukui ..................... G06N 20/00 |
| 2019/0095763 | A1 | 3/2019 | Arilla et al. |
| 2019/0130232 | A1 | 5/2019 | Kaasila et al. |
| 2020/0219274 | A1* | 7/2020 | Afridi .................. G06K 9/6259 |

FOREIGN PATENT DOCUMENTS

| | | |
|---|---|---|
| EP | 2857983 | 4/2015 |
| JP | 06-258982 | 9/1994 |
| JP | H10-124030 | 5/1998 |
| JP | 2002-507289 | 3/2002 |
| JP | 2003-288184 | 10/2003 |
| JP | 05-215915 | 8/2005 |
| JP | 05-217816 | 8/2005 |
| JP | 2007-011733 | 1/2007 |
| JP | 2009-545064 | 12/2009 |
| JP | 5140997 | 11/2012 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 04/012099 | 2/2004 |
| WO | WO 05/001675 | 1/2005 |
| WO | WO 2008/013720 | 1/2008 |

OTHER PUBLICATIONS

European Search Report in European Application No. 18197313.2, dated Nov. 30, 2018, 7 pages.
Chen et al., "Detecting and reading text in natural scenes," Proceedings of the 2004 IEEE Computer Society Conference Vision and Pattern Recognition; Publication [online]. 2004 [retrieved Dec. 16, 2018], Retrieved from the Internet: <URL: http://citeseerx.ist.psu.edu/viewdoc/download?doi=10.1.1.334.2715&rep=rep1&type=pdf>; pp. 1-8.
International Search Report & Written Opinion in International Application No. PCT/US18/58191, dated Feb. 19, 2019, 17 pages.
"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.
"Announcing Speakeasy: A new open-source language tool from Typekit," Oct. 28, 2010, online http://blog.typekit.com/2010/10/28/announcing-speakeasy-a-new-open-source-language-tool-from-typekit/.
"colorfont/v1," Feb. 28, 2011, retrieved from the internet: http://manufacturaindependente.com/colorfont/v1/.
"Flash CS4 Professional ActionScript 2.0", 2007, retrieved on http://help.adobe.com/en_US/AS2LCR/Flash_10.0/help.html?content=00000284.html on Aug. 31, 2015.
"photofont.com—Use photofonts," Sep. 2, 2012, retrieved from the internet: http://web.archive.org/web/20120902021143/http://photofont.com/photofont/use/web.
"Saffron Type System", retrieved from the internet Nov. 12, 2014, 7 pages.
Adobe Systems Incorporated, "PostScript Language Reference—Third Edition," Feb. 1999, pp. 313-390.
Adobe Systems Incorporated, "The Type 42 Font Format Specification," Technical Note #5012, Jul. 31, 1998, pp. 1-24.
Adobe Systems Incorporated, "To Unicode Mapping File Tutorial," Adobe Technical Note, XP002348387, May 2003.
Apple Computers, "The True Type Font File," Oct. 27, 2000, pp. 1-17.
Celik et al., "W3C, CSS3 Module: Fonts," W3C Working Draft, Jul. 31, 2001, pp. 1-30.
Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.
European Search Report, 13179728.4, dated Sep. 10, 2015, 3 pages.
European Search Report, 14184499.3, dated Jul. 13, 2015, 7 pages.
European Search Report, 14187549.2, dated Jul. 30, 2015, 7 pages.
Extensis, Suitcase 10.2, Quick Start Guide for Macintosh, 2001, 23 pgs.
Font Pair, [online]. "Font Pair", Jan. 20, 2015, Retrieved from URL: http://web.archive.org/web/20150120231122/http://fontpair.co/, 31 pages.
Forums.macrumors.com [online], "which one is the main FONTS folder ?" May 19, 2006, [retrieved on Jun. 19, 2017], Retrieved from the Internet: URL<https://forums.macrumors.com/threads/which-one-is-the-main-fontsfolder.202284/>, 7 pages.
George Margulis, "Optical Character Recognition: Classification of Handwritten Digits and Computer Fonts", Aug. 1, 2014, URL: https://web.archive.org/web/20140801114017/http://cs229.stanford.edu/proj2011/Margulis-OpticalCharacterRecognition.pdf.
Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.
International Preliminary Report on Patentability issued in PCT application No. PCT/US2013/071519 dated Jun. 9, 2015, 8 pages.
International Preliminary Report on Patentability issued in PCT application No. PCT/US2015/066145 dated Jun. 20, 2017, 7 pages.
International Preliminary Report on Patentability issued in PCT application No. PCT/US2016/023282, dated Oct. 26, 2017, 9 pages.
International Search Report & Written Opinion issued in PCT application No. PCT/US10/01272, dated Jun. 15, 2010, 6 pages.
International Search Report & Written Opinion issued in PCT application No. PCT/US2011/034050 dated Jul. 15, 2011, 13 pages.
International Search Report & Written Opinion, PCT/US2013/026051, dated Jun. 5, 2013, 9 pages.
International Search Report & Written Opinion, PCT/US2013/071519, dated Mar. 5, 2014, 12 pages.
International Search Report & Written Opinion, PCT/US2013/076917, dated Jul. 9, 2014, 11 pages.
International Search Report & Written Opinion, PCT/US2014/010786, dated Sep. 30, 2014, 9 pages.
International Search Report & Written Opinion, PCT/US2016/023282, dated Oct. 7, 2016, 16 pages.
Japanese Office Action, 2009-521768, dated Aug. 28, 2012.
Japanese Office Action, 2013-508184, dated Apr. 1, 2015.

(56) References Cited

OTHER PUBLICATIONS

Ma Wei-Ying et al., "Framework for adaptive content delivery in heterogeneous network environments", Jan. 24, 2000, Retrieved from the Internet: http://www.cooltown.hp.com/papers/adcon/MMCN2000.
Open Text Exceed, User's Guide, Version 14, Nov. 2009, 372 pgs.
Saurabh, Kataria et al., "Font retrieval on a large scale: An experimental study", 2010 17th IEEE International Conference on Image Processing (ICIP 2010); Sep. 26-29, 2010; Hong Kong, China, IEEE, Piscataway, NJ, USA, Sep. 26, 2010, pp. 2177-2180.
Supplementary European Search Report, European Patent Office, European patent application No. EP 07796924, dated Dec. 27, 2010, 8 pages.
TrueType Fundamentals, Microsoft Typography, Nov. 1997, pp. 1-17.
Typeconnection, [online], "typeconnection", Feb. 26, 2015, Retrieved from URL: http://web.archive.org/web/20150226074717/http://www.typeconnection.com/step1.php, 4 pages.
Universal Type Server, Upgrading from Suitcase Server, Sep. 29, 2009, 18 pgs.
Wenzel, Martin, "An Introduction to OpenType Substitution Features," Dec. 26, 2012, Retrieved from the internet: http://web.archive.org/web/20121226233317/http://ilovetypography.com/OpenType/opentype-features. Html (retrieved on Sep. 18, 2014), 12 pages.
Written Opposition to the grant of Japanese Patent No. 6097214 by Masatake Fujii, dated Sep. 12, 2017, 97 pages, with partial English translation.
Koren et al., "Visualization of labeled data using linear transformations." IEEE Symposium on Information Visualization, 2003 (IEEE Cat. No. 03TH8714).
Liu, "Visual Exploration and Comparative Analytics of Multidimensional Data Sets", Graduate Program in Computer Science and Engineering, The Ohio State University, 2016, 210 pages.
Shusen, et al. "Distortion-Guided Structure-Driven Interactive Exploration of High-Dimensional Data," Computer Graphics Forum., 2014, 33(3):101-110.
Wu et al., "Stochastic neighbor projection on manifold for feature extraction." Neurocomputing, 2011,74(17):780-2789.

* cited by examiner 600
602

| | |
|---|---|
| 1 | Media pixels sum |
| 2 | Media likes count |
| 3 | Caption characters length |
| 4 | Color : variance hue |
| 5 | Media comments count |
| 6 | Footwear detected score |
| 7 | Caption hashtag ratio |
| 8 | Jewelry detected score |
| 9 | Customer Vertical |
| 10 | Green value |
| 11 | Red Value |
| 12 | Fashion detected score |
| 13 | Color: saturation value variation coefficient |
| 14 | Blue Value |
| 15 | Color: Saturation variance |
| 16 | Color: Brightness Variance |
| 17 | Color: Hue variation coefficient |
| 18 | Color: Brightness variation coefficient |
| 19 | Caption: counts of uppercase characters |
| 20 | Caption: non alphanumerics characters count |
| 21 | Hashtags: Jaccard distance to the most frequent list |
| 22 | Caption: Count of hashtags |
| 23 | Hashtags: Reach Score |
| 24 | Caption: words count |
| 25 | Hashtags: language |
| 26 | Number of faces detected |
| 27 | Media orientation (square, landscape, portrait) |
| 28 | Hashtags: Jaccard distance to the most popular list |
| 29 | Media: instagram filter applied |
| 30 | Customer ID |
| 31 | Location: country |
| 32 | Hashtags: Category |
| 33 | Hashtag: ratio of used vs most frequent list |
| 34 | Location: Continent |
| 35 | Caption: Language |
| 36 | Media: Source of image (instagram, twitter, facebook, uploaded from customer, |
| 37 | Hashtags: encoding |
| 38 | Hashtags: Count per segment |

FIG. 6A

| 600 | 604 |
|---|---|
| | Description |

Sum of media pixels, overall.
Total number of likes the media obtained while monitored by collectors.
Lenght of the media caption, in characters.
Statistical variation ratio of the media hue, roughly measuring how pure the colors contained in the media are.
Total number of comments the media obtained while monitored by collectors.
Probability of the media containing footwear as per our ad-hoc computer vision detector.
Quotient of hashtags and mentions the media has in the caption by the total number of words.
Probability of the media containing jewelry as per our ad-hoc computer vision detector.
Vertical the customer belongs to as per Travel, Fashion, etc.
Green value in the RGB scale, for the dominant shade of that colour.
Red value in the RGB scale, for the dominant shade of that colour
Probability of the media containing fashionable content (as in dressess, or other apparel) as per our ad-hoc computer vision detector.
Statistical variation ratio of the media saturation, roughly measuring how colorful the picture is.
Blue value in the RGB scale, for the dominant shade of that colour.
Statistical variance of the picture saturation, proxy of how many different colors the picture got, roughly.
Statistical variance of of the picture Brightness, analog to the overall contrast on the image.
Roughly a measurement on the variation of colors in terms of types across the image.
Measurement of how well exposed the media is.
Count of words starting with uppercase in the media caption.
How many non alphanumeric characters are contained in the media caption.
Similarity of the list of hashtags in the caption to the most frequent mined from instagram.
Total count of hashtags in the media caption.
Sum of overall term frequency for the present hastags in the media caption based on a frequency list mined from instagram.
Count of words in the caption.
Language detected for the present hashtags in the media caption.
Faces present in the media as per our computer vision detector.
Overall shape of the media.
Similarity of the present hashtags with the most popular as mined from instagram.
The filter applied to the picture, as obtained from instagram.
The Olapic unique customer ID.
In which country the image was produced as per its geotag.
Which category, as oritymined from instagram, the hashtags present in the caption belongs to, as determined by the majority.
Ratio, for the present hashtags, to the most frequent ones as mined from instagram.
Continent/Region the image was produced in, as per its geotag.
In wich language the caption is written.
Source of the image collection.
Text enconding the hashtags
Segmented count of the hashtags as mined from Instagram

FIG. 6B

USING ATTRIBUTES FOR PREDICTING IMAGERY PERFORMANCE

BACKGROUND

This description relates to identifying images associated with particular subjects and that may be of interest to end viewers. By employing attributes to represent individual images, the images can be efficiently analyzed to identify appropriate images for selection and presentation.

Proportional to the astronomical growth of imagery presented over the Internet, the demand for such content has grown. Online viewers have grown accustomed to being presented a large variety of imagery when reviewing products, services, etc. While professionally prepared imagery is used to present viewers with such visuals, nonprofessionally prepared imagery is also used for presentation.

SUMMARY

The systems and techniques described can aid individuals such as designers (e.g., website designers), marketers (e.g., marketing particular brand product, services, etc.), etc. with selecting imagery for presentation to viewers (e.g., end users, potential purchasers, etc.). Employing machine learning techniques, imagery can be identified that is likely to resonate with viewers (e.g., end users). By training a machine learning system with images and image types that have previously demonstrated positive performance (e.g., attracted attention from users, received commentary on social networks, transaction generation, etc.), similarly good performing images can be identified for particular products, services, brands, etc. of interest. Once identified, images can be selected for presenting to end users (e.g., inserted into websites, webpages, etc.). Further, the presented images can be monitored (e.g., for user interaction, transactions, etc.) to collect feedback to continue training of the machine learning system and further improve predicting image performance.

In one aspect, a computing device implemented method includes determining a ranking of images using a machine learning system. The machine learning system is trained using attributes that represent each of a plurality of training images. The attributes include imagery attributes, social network attributes, and textual attributes. The method also includes producing a listing of the ranked images for selecting one or more of the ranked images for a brand entity associated with the selected ranked images.

Implementations may include one or more of the following features. The method may also include further training of the machine learning system using data associated with the ranked images. The data associated with the ranked images may represent user interactions with a subset of the ranked images. The data associated with the ranked images may present transactions with a subset of the ranked images. The imagery attributes may represent one or more colors included in a corresponding image of the plurality of training images. The textual attributes may represent a count of words present in a corresponding image of the plurality of training images. The textual attributes may represent a count of characters present in a corresponding image of the plurality of training images. The social network attributes may include a count of positive indications from social network users. The social network attributes may include a count of topic-identifying text. The attributes may represent the geographical source of a corresponding image of the plurality of training images. The attributes may represents wearable items present in a corresponding image of the plurality of training images.

In another aspect, a system includes a computing device that includes a memory configured to store instructions. The system also includes a processor to execute the instructions to perform operations that include determining a ranking of images using a machine learning system. The machine learning system is trained using attributes that represent each of a plurality of training images. The attributes include imagery attributes, social network attributes, and textual attributes. Operations also include producing a listing of the ranked images for selecting one or more of the ranked images for a brand entity associated with the selected ranked images.

Implementations may include one or more of the following features. The operations may also include further training of the machine learning system using data associated with the ranked images. The data associated with the ranked images may represent user interactions with a subset of the ranked images. The data associated with the ranked images may present transactions with a subset of the ranked images. The imagery attributes may represent one or more colors included in a corresponding image of the plurality of training images. The textual attributes may represent a count of words present in a corresponding image of the plurality of training images. The textual attributes may represent a count of characters present in a corresponding image of the plurality of training images. The social network attributes may include a count of positive indications from social network users. The social network attributes may include a count of topic-identifying text. The attributes may represent the geographical source of a corresponding image of the plurality of training images. The attributes may represents wearable items present in a corresponding image of the plurality of training images.

In another aspect, one or more computer readable media store instructions that are executable by a processing device, and upon such execution cause the processing device to perform operations including determining a ranking of images using a machine learning system. The machine learning system is trained using attributes that represent each of a plurality of training images. The attributes including imagery attributes, social network attributes, and textual attributes. Operations also include producing a listing of the ranked images for selecting one or more of the ranked images for a brand entity associated with the selected ranked images.

Implementations may include one or more of the following features. The operations may also include further training of the machine learning system using data associated with the ranked images. The data associated with the ranked images may represent user interactions with a subset of the ranked images. The data associated with the ranked images may present transactions with a subset of the ranked images. The imagery attributes may represent one or more colors included in a corresponding image of the plurality of training images. The textual attributes may represent a count of words present in a corresponding image of the plurality of training images. The textual attributes may represent a count of characters present in a corresponding image of the plurality of training images. The social network attributes may include a count of positive indications from social network users. The social network attributes may include a count of topic-identifying text. The attributes may represent the geographical source of a corresponding image of the plurality of training images. The attributes may represents wearable items present in a corresponding image of the plurality of training images.

These and other aspects, features, and various combinations may be expressed as methods, apparatus, systems, means for performing functions, program products, etc.

Other features and advantages will be apparent from the description and the claims.

DESCRIPTION OF DRAWINGS

FIGS. 6A and 6B are a listing of attributes to represent imagery.

DETAILED DESCRIPTION

Figure 1:
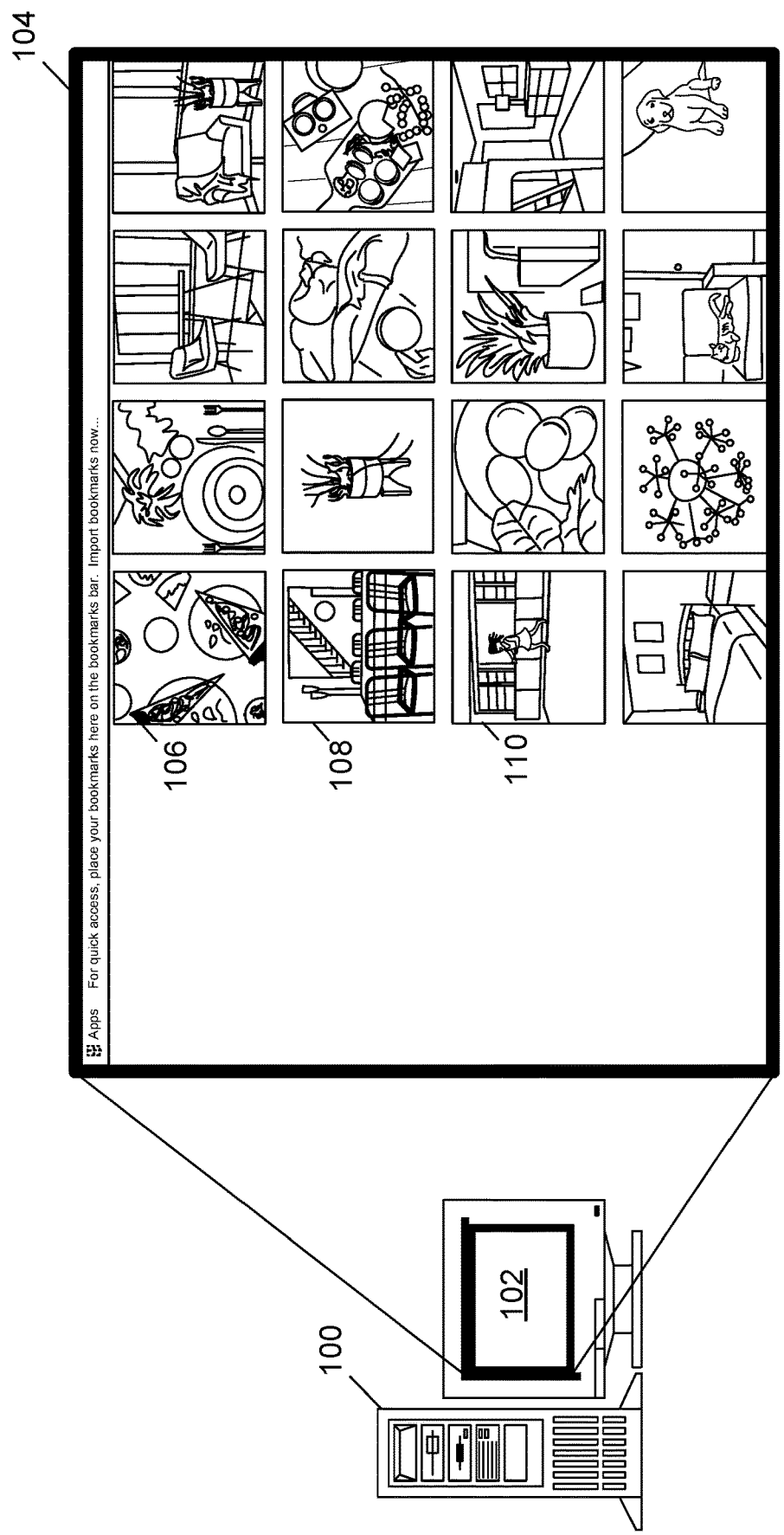
FIG. 1 illustrates a computer system presenting imagery of a website.

Referring to FIG. 1 a computing device (e.g., a computer system 100) includes a display 102 that allows a user to view various types of content (e.g., text, images, etc.) associated with one or more entities, institutions, etc. In this particular example, a website 104 is presented on the display 102 that includes imagery associated with a particular brand (e.g., images 106-110 present products of a particular brand). Such imagery can include galleries of images associated with a brand (e.g., a developer, manufacturer, distributor, etc., of a product, service, etc. under a particular name), product detail pages (PDPs), etc. As is often the case, brands, entities, etc. are interested in presenting images the generate activity (e.g., viewing of the images, having items selected for purchase, etc.). Considering the amount of available imagery, the selection of appropriate imagery can be considerably time consuming. Further, selected imagery may need to be monitored to determine if the desired effect is being achieved (e.g., does the imagery cause interest in the presented product). Rather than burdening marketing professionals with such tasks, computational techniques can be employed to review, select, and monitor imagery (e.g., associated with different brand products, services, etc.) and quickly identify adjustments. Further, computational techniques can predict if new imagery could provide improvement (e.g., increase viewing traffic) compared to current imagery and possibly indicate that image replacement, augmentation, etc. is warranted.

Figure 2:
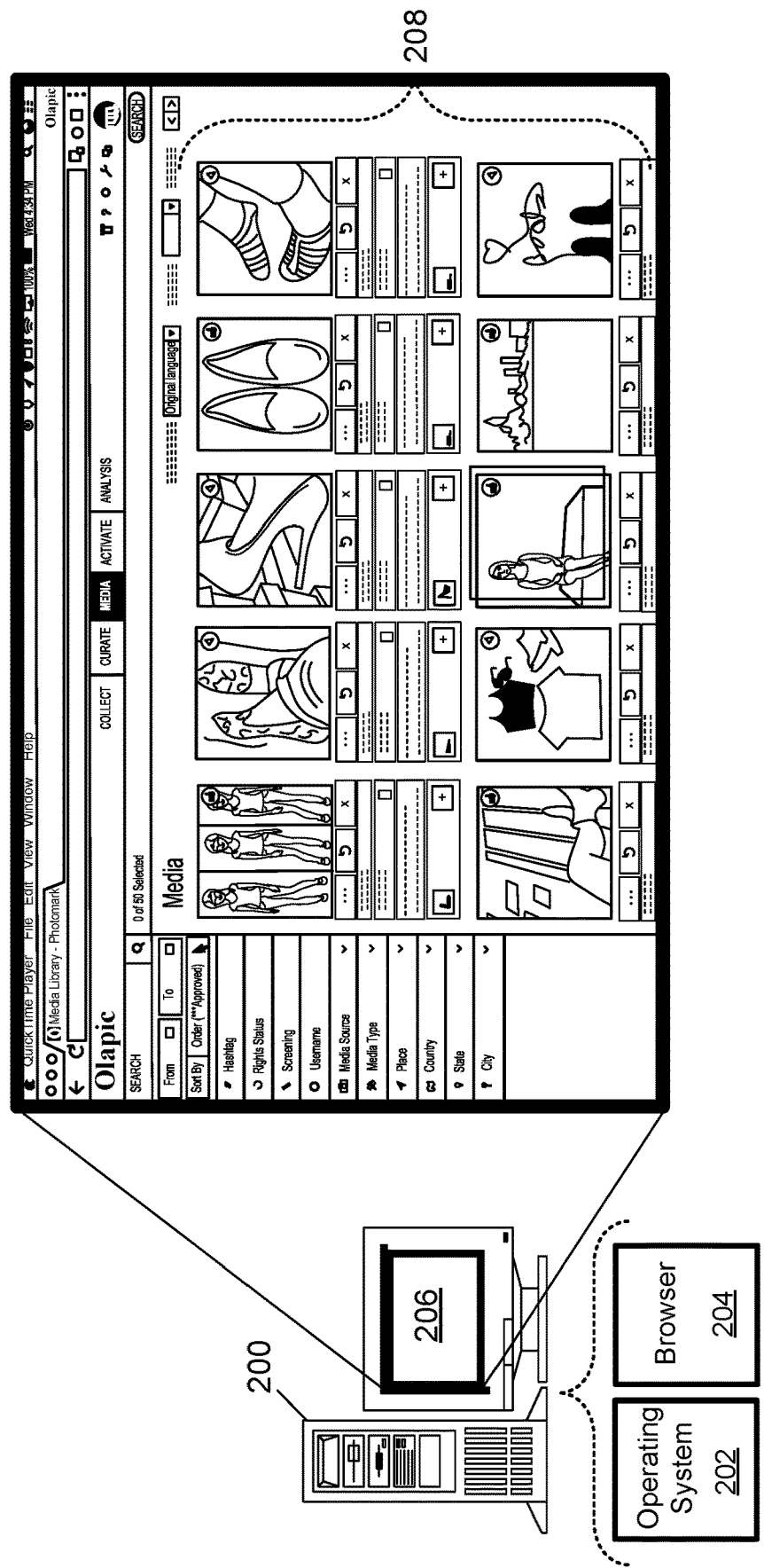
FIG. 2 illustrates a computer system presenting imagery selected for a brand.

Referring to FIG. 2, various types of imagery, imagery sources, etc. may be employed to identify imagery that would resonant with end-users (e.g., website viewers, potential purchasers, etc.). For example, imagery created by product users (e.g., actual product purchasers) may resonant more with viewers (and potential new purchasers) comparted to professionally generated imagery. As such, an overwhelming amount of imagery from many more sources may be of interest to brand owners, brand marketers, etc. to present their products, services, etc. Many of these imagery sources may be Internet based such as social network platforms and other computer network accessible sources. To address the sheer amount of accessible imagery content, one or more computational techniques may be employed to efficiently collect, curate, and present images of interest. Further, along with the imagery itself, other information can be collected and used to identify likely successful images (e.g., images that when presented increase viewer interactions).

In one arrangement, computational techniques are employed for a number of tasks; for example, imagery may be collected and appropriately filtered to remove unwanted content (e.g., filter out off-brand imagery and retain imagery relevant to the brand). Computational tasks may also include forming an association between the retained imagery and brands. For example, products and images of the products may be associated. Context may be added to the imagery (e.g., insert keywords into images) to form an association between a product, service, etc. with an image. Computational techniques can also be employed for ranking imagery to predict which images may be top-performers and should be provided to brand owners, band marketers, etc., for presentation (e.g., have predicted top-performing images inserted into websites, etc.).

As presented in the figure, a computer system 200 executes an operating system 202 and a browser 204 to present brand-related imagery (e.g., images of brand products, services, etc.) for user interaction (e.g., viewing, selecting, purchasing, etc.). In this particular example, a series of images 208 are presented on the display 206 that are associated with footwear of one or more brands. Computational techniques collect and filter imagery from one or more sources (e.g., social network sites) to identify an appropriate set of relevant images (e.g., on-brand images). Upon being identified, products, services, etc. are associated with these images (e.g., each image is tagged with a corresponding footwear type represented in the image) and the associations are stored for later use. Once the imagery has been curated and tagged, one or more computational techniques can be employed to predict which images are likely to perform well when presented to viewers. For example, after identifying hundreds of images and providing context (e.g., associating a keyword with each image), the images may be ranked to identify potential top performers. Once identified, these top performers (e.g., the ten images included in the series of images 208) may be selected for presentation.

Figure 3:
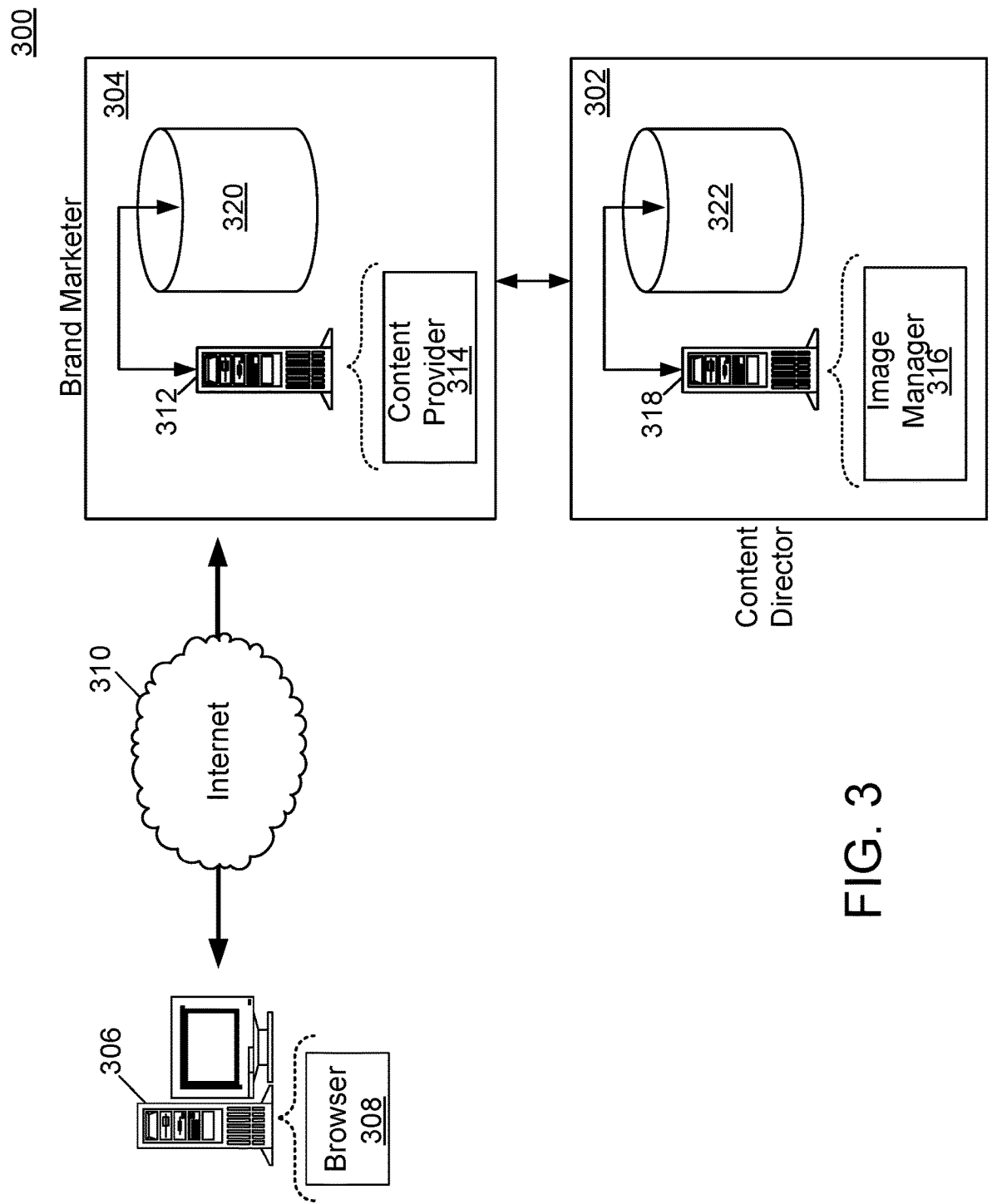
FIG. 3 is a block diagram of a network environment including a content director that manages imagery for entities.

Referring to FIG. 3, a network architecture 300 is presented that includes a content director 302 that identifies appropriate content (e.g., imagery) for one or more entities (e.g., a brand marketer 304, a brand owner, etc.) to present their products, services, etc. to end users (e.g., a computer system 306 executes a browser 308 to present imagery provided via the Internet 310). In this example a computer system 312 executes a content provider 314 at the site of the brand marketer 304 to provide the imagery and related information to the end user. In some arrangements, other network architectures may be employed; for example, one or more publishers may be an intermediary between the brand marketer 304 and end users. In this example, an image manager 316 is executed by a computer system 318 (at the content director 320) that performs operations on imagery (e.g., collects, filters, tags, ranks, etc.) prior to delivery to the brand marketer 304 (e.g., for storing in a storage device 320). Collected and processed content (e.g., collected images, image rankings, etc.) may be stored at the content director 302 (e.g., in a storage device 322).

To perform operations, the image manager 316 may employ one or more computational techniques; for example, one or more machine learning techniques may be used. Through such machine learning techniques, the image manager 316 uses artificial intelligence to automatically learn and improve from experience without being explicitly programmed. Once trained (e.g., from known imagery), one or more images, representation of images, etc. can be input into the image manager 316 to yield an output. By providing the output back (e.g., feedback), the machine learning technique can use the output as additional training information. Along with using increased amounts of training data (e.g., image representations), feedback data (e.g., output image representations) can increase result accuracy (e.g., predicting top performing images).

Other forms of artificial intelligence techniques may be used by the image manager 316 along with the network architecture 300. For example, to process information (e.g., images, image representations, etc.) to prepare image recommendations, etc., the architecture may employ one or more knowledge-based systems such as an expert system. In general, such expert systems are designed solving relatively complex problems by using reasoning techniques that may employ conditional statements (e.g., if-then rules). In some arrangements such expert systems may use multiple systems such as a two sub-system design, in which one system component stores structured and/or unstructured information (e.g., a knowledge base) and a second system component applies rules, etc. to the stored information (e.g., an inference engine) to determine results of interest (e.g., font recommendations).

Figure 4:
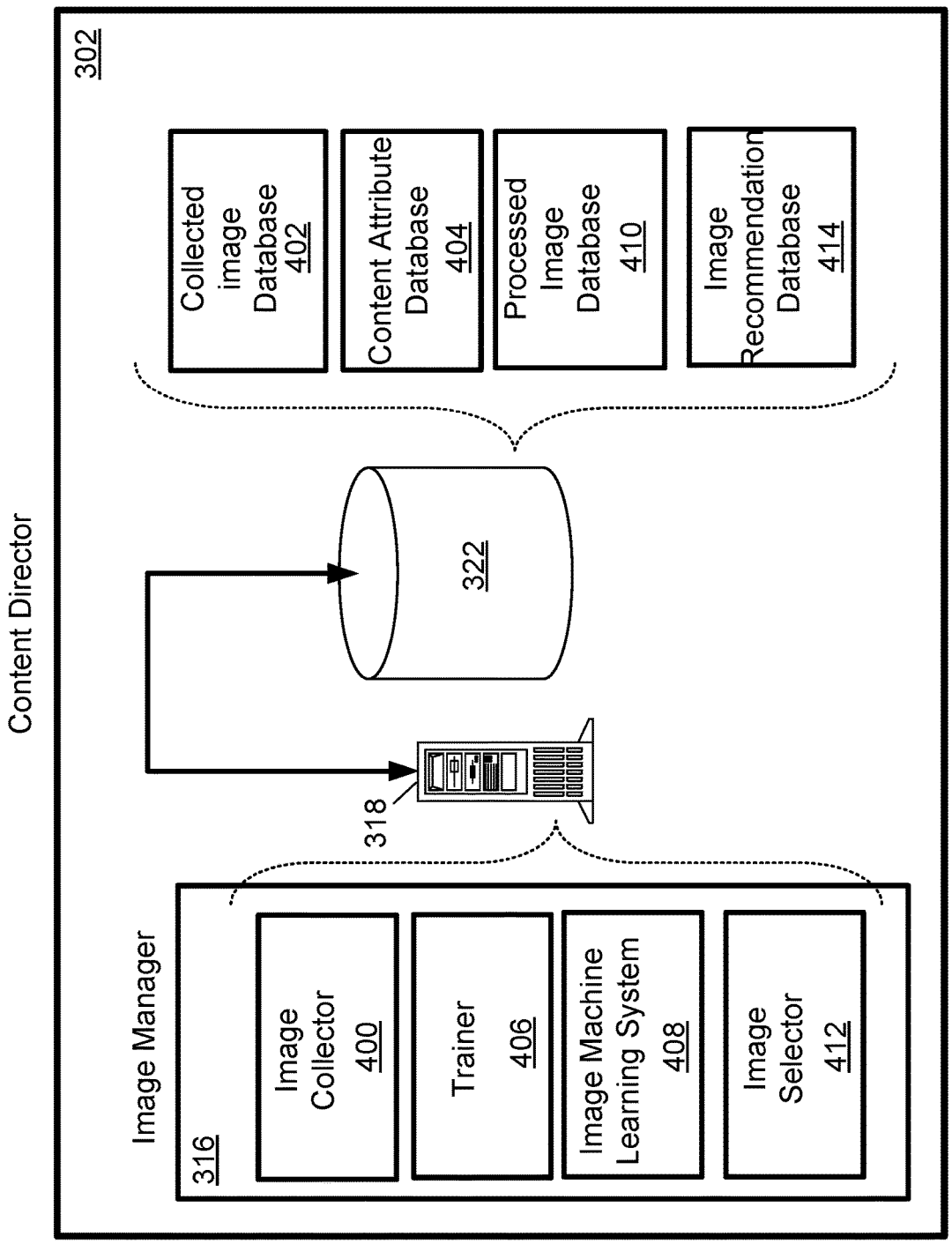
FIG. 4 is a block diagram of the content director shown in FIG. 3.

Referring to FIG. 4, the image manager 316 (which includes a number of modules) is executed by the server 318 present at the content director 302. In this arrangement, the image manager 316 includes an image collector 400 that is capable of receiving data that represents images. For example, a number of attributes that reflect aspects of an image (e.g., graphic aspects, content aspects, text content aspects, etc.) may be received by the image collector 400. Such attributes can be represented in various forms; for example, each attribute may be represented by one or more numerical values (e.g., Boolean values, fix point values, etc.) and all of the attributes may be provided in single form (e.g., a vector of numerical values) to the image collector 400. In this arrangement, such data may be previously stored (e.g., images stored in a collected image database 402) and retrieved from the storage device 322. In some arrangements, the attributes may be provided by one or more processes executed at the content director 302, remotely executed processes, etc. Once attributes are identified for an image (e.g., represented in a vector of numerical values), the data is stored in an image attribute database 404. Retrieving the attribute data from the database 404, a trainer 406 provides the attribute data representing the images to train an image machine learning system 408. Various type of data may be used for training the system; for example attribute data representing one or more collections of previously known images (e.g., of products) may be provided from the trainer 406 to the image machine learning system 408. Once trained, the image machine learning system 408 may be provided input data such as attribute data representing other images to determine which images are likely to perform well if presented to end users (e.g., potential purchases of the product, service, etc. represented in the images). For example, once filtered (e.g., to remove off-brand images) and tagged (e.g., to associate the image with a brand product), the image machine learning system 408 may produce a listing of images that are ranked based upon their attributes, the training of the machine learning system, etc. Upon identifying the listing of ranked images, data may be stored in a processed image database 410 (e.g., data representing the images, representing attributes of the images, etc.) for later retrieve and use (e.g., to further train the image machine learning system 408). Along with storing the listing of ranked images, other processing may be performed by the image manager 316 to prepare and provide appropriate data to a brand marketer, brand owner, publisher, etc. For example, an image selector 412 executed by the server 318 may select one or more images for sending to a brand marketer. One or more predefined rules (e.g., select the top ten ranked images) to select from the ranked image listing provided by the image machine learning system 408. In some arrangements, the image machine learning system 408 may execute image selection operations. Additionally, the selected images along with corresponding data (e.g., attribute data representing the selected images) may be stored in an image recommendation database 414 for later retrieval and use (e.g., training the image machine learning system 408, comparison studies, etc.).

Figure 5:
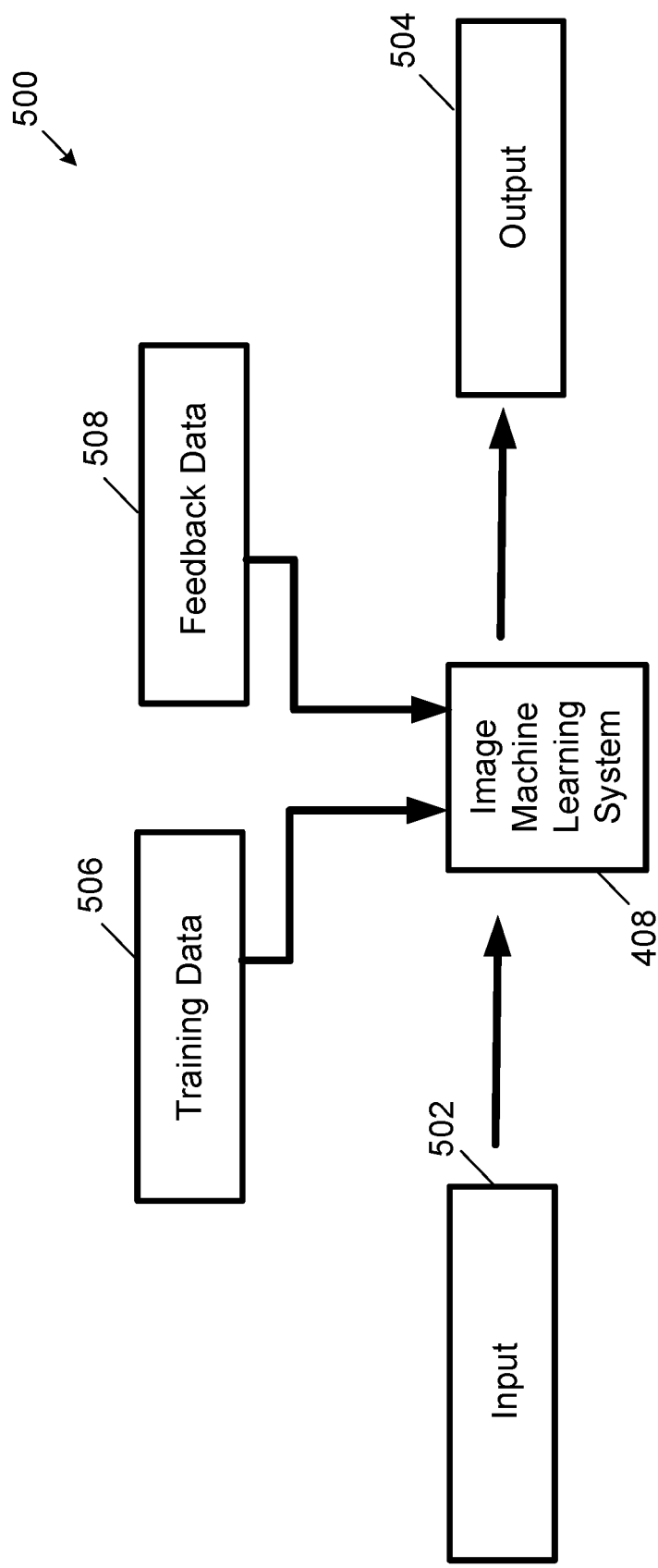
FIG. 5 is a block diagram of an image machine learning system being trained.

Referring to FIG. 5, a block diagram 500 is presented that provides a graphical representation of the functionality of the image machine learning system 408 (shown in FIG. 4). Prior to using the learning system 408 to process an input 502 (e.g., a series of images associated with a brand) to produce an out 504 (e.g., a ranked listing of the input images), the learning system needs to be trained. Various types of training data 506 may be used to prepare the image machine learning system 408 to identify imagery that a brand (e.g., a brand marketer) might potentially use to present brand products, services, etc. to end users (e.g., potential purchasers). For example, imagery identified as being associated with the brand (e.g., images of the brand's product, image of the brand's product in use, etc.) can be used to train the system. Data representing end user interactions may also be employed as training data 506; for example, websites associated with the brand (e.g., websites presenting the brand products, services, etc.) can be monitored for user interaction with imagery being presented. Such interactions may include pointing device (e.g., mouse, track pad, etc.) interactions with a site (e.g., clicking on an image, selecting product webpages for review, etc.) that can be tracked and data representing these interactions can be considered training data 506 used to prepare the image machine learning system 408. Other types of interaction data may also be employed; for example, websites can be monitored for transactions associated with brand items. In one arrangement tracking software (e.g., pixel tracking software, software agents, etc.) can monitor purchases involving brand products and send notifications (e.g., to the brand marketer 304, the content director 302, etc.) that include details about such transactions. Alerted to which types of imagery, brand products, etc. are resonating with end users (e.g., being interacted with, initiating purchases, etc.), this interaction data can also be used as training data 506.

Imagery may also be provided from other sources; for example, social networks (e.g., Facebook, Twitter, Instagram, etc.) often present imagery (e.g., in posts, messages, etc.) associated with a brand (e.g., products, services, etc.). By monitoring such networks (e.g., using software agents, etc.), images may be collected and potentially used as training data 506. Additionally, such imagery can be collected for use as input 502 to the image machine learning system 408, once the system has been initially trained. Such imagery may be professionally prepared; however, imagery created by end users (e.g., product users) can be more visually inviting and may attract more interactions from potential purchasers than other types of imagery (e.g., professionally prepared product images).

To provide such training data 506 to the image machine learning system 408, one or more techniques may be employed; for example, data that represents each image can be provided. For example, images of brand product images that have evoked heavy end user interactions can be represented by a collection of attributes in which each attribute reflects a particular aspect of the respective image. In some arrangements, some attributes can be categorized; for example, one attribute category can be associated with visual characteristics of images (e.g., color, resolution, etc.) while another may be associated with the source of images (e.g., geographical capture location of an image) while still another category may include social network attributes (e.g., social network source, viewer reactions to image, etc.). Attributes can also be characterized for reflecting textual content included in the imagery; for example, the amount of text and type of text can affect how an end user may react to an image. Textual content may assist generating interest in some brand products while textual content of other brands, brand products, etc. may be a detriment to attracting notice from end users.

Once initially trained, input 502 may be provided to the image machine learning system 408 to generate output 504. For example, further imagery (e.g., a group of images) may be collected, created, etc. and input to identify the particular images that may be of interest to a brand marketer based upon the data used to train the learning system (e.g., data, images, etc. that reflect positively with end users). As such, the image machine learning system 408 can predict images that should perform well with end users. Additionally, the predicted images can be used to further train the machine learning system and improve predictive accuracy, for example, based on more contemporary data that reflects desired performance with end users. As illustrated in the figure, feedback data 508 can be provided to the image machine learning system 408 to further the training. Recently used images that have performed well can be represented (e.g., in attributes) and provided to the image machine learning system 408. Interaction data such as data that represents user interacting with recently presented images (e.g., click data indicating users selecting images, data indicating users have hovered a pointing device on the image, etc.), data that represents users executing transactions based upon recently presented images (e.g., initiating the purchase of a brand product, service, etc.), etc. Along with providing the feedback data 508 to the image machine learning system 408 to improve accuracy, the feedback data can be stored (e.g., at the storage device of the content director 302) for later retrieval and further processing (e.g., training other machine learning systems, attribute adjustments, etc.).

To implement the image machine learning system 408, one or more machine learning techniques may be employed. For example, supervised learning techniques may be implemented in which training is based on a desired output that is known for an input. Supervised learning can be considered an attempt to map inputs to outputs and then estimate outputs for previously unseen inputs (a newly introduced input). Unsupervised learning techniques may also be employed in which training is provided from known inputs but unknown outputs. Reinforcement learning techniques may also be used in which the system can be considered as learning from consequences of actions taken (e.g., inputs values are known and feedback provides a performance measure). In some arrangements, the implemented technique may employ two or more of these methodologies.

In some arrangements, neural network techniques may be implemented using the data representing the images (e.g., a vector of numerical values to represent each attribute, etc.) to invoke training algorithms for automatically learning the images and related information. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to training data. By using the image data (e.g., attribute vectors), a function may be defined that quantifies error (e.g., a squared error function used in regression techniques). By minimizing error, a neural network may be developed that is capable of determining attributes for an input image. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implements to reduce its effects.

One type of machine learning referred to as deep learning may be utilized in which a set of algorithms attempt to model high-level abstractions in data by using model architectures, with complex structures or otherwise, composed of multiple non-linear transformations. Such deep learning techniques can be considered as being based on learning representations of data. In general, deep learning techniques can be considered as using a cascade of many layers of nonlinear processing units for feature extraction and transformation. The next layer uses the output from the previous layer as input. The algorithms may be supervised, unsupervised, combinations of supervised and unsupervised, etc. The techniques are based on the learning of multiple levels of features or representations of the data (e.g., image attributes). As such multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Referring to FIG. 6, a chart 600 is presented that includes a collection of attributes that can be used to represent an image to the image machine learning system 408. Along with a column 602 that provides a title of each of the thirty-eight attributes (in this particular example), the chart 600 also includes a column that provides a general description of each attribute. Each of the thirty-eight attributes can be generalized into a relative small set of categories; for example, some of the attributes can be incudes in a category associated with the visual aspects of an image (e.g., included colors, resolution, etc.). One attribute category can be associated with the source of the image (e.g., geographical location that the image represents) and another category can be associated with any industry associated with the imagery. Textual content included in the imagery can also be considered an attribute category. For example, the amount of text (e.g., word count), language of the text, etc. can be represented by attributes of the category. One or more social network categories can include a number of attributes. For example, attributes associated with positive user reactions (e.g., positive postings, comments, etc.) can be members of this category. Additional categories can be included, one or more of the categories removed, replaced, etc. for assisting with the organizing of the attributes. As provided by the chart 600, a total of thirty-eight attributes are used to represent an image, in this example. Some of the attributes (e.g., media pixel sum, media likes sum) are associated with how the imagery has been received by viewer (e.g., when the image was presented on a social network). An attribute may also represent the number of characters included in one or more textual captions included in an image. Caption attributes may also represent the number of words in a caption, a count of alphanumerical or non-alphanumerical present in a caption, the language in which the caption is presented in the image, etc. Caption attributes can also reflect the amount of tagged text included in a caption (e.g., hashtags used to represent words, terms, etc. to assist with searching, browsing, etc.). Attributes associated with visual aspects of an image can included a representation of hue variance, the relative amount of a particular color in an image (e.g., green, red, blue), color brightness, color saturation, variation in color hue, etc.

Attributes can also represent particular types of products, services, etc. that are represented in the respective image. For example, an attribute may represent the probability that footwear, jewelry, etc. is present in the image. Information associated with social networks is also representable by attributes; for example, tagged textual content such as hashtags can be reflected in one or more attributes. In some arrangements, attributes can reflect the similarity of hashtags present in an image caption, the number of hashtags present in an image caption, etc. Attributes associated with hashtags can reflect the frequency of one or more particular hashtags appearing in a caption, the frequency of a hashtags based upon the occurrence of in particular social network applications (e.g., Facebook, Instagram, etc.). The similarity of hashtags (present in a caption) compared to hashtags identified as popular can be reflected in an attribute along with the language of a hashtag. Other types of information may also be the subject of one or more attributes; for example, an identifier of an individual (e.g., a previously known customer) may be represented along with the geographical location of the image, where the image was captured, etc. By assigning a numerical value or other data type (e.g., a Boolean value) to each of the thirty-eight attributes shown in chart 600, each image can be characterized in a manner that allows the image machine learning system to be trained to predict if an image could potentially attract viewers to the product, service, etc. of a brand included in the image.

Figure 7:
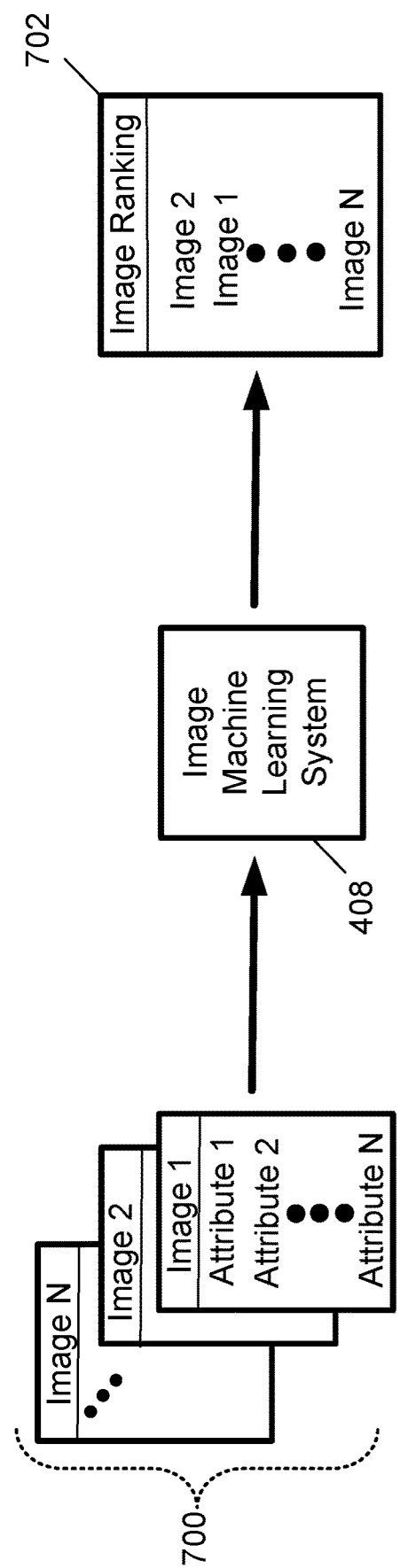
FIG. 7 is a block diagram of an image machine learning system providing a list of ranked images.

Referring to FIG. 7, a data flow diagram graphically represents operations of the image machine learning system 408 after being initially trained. For example, training data from a number of sources; for example, a considerable number of training images (e.g., each being represented by thirty-eight attributes), interaction data (e.g., click data, etc. representing user interactions with images), and transaction data (e.g., representing images selected for purchasing by users, etc.). Image input may be provided one or more forms into the image machine learning system 408; for example, data representing N attributes of an image can be entered into the system. In one arrangement, thirty-eight attributes (shown in chart 600 of FIG. 6) are each assigned a value (e.g., a Boolean value, a numerical value, etc.) to represent corresponding aspects of an image and are input into the image machine learning system 408. In the illustrated example, a collection 700 of N images are each numerically represented (e.g., by thirty-eight attributes) and provided to the image machine learning system 408. Based upon the training data (e.g., similar attributes representing training images, interaction data, transaction data), the system 408 estimates the performance of each input image (e.g., attempts to measure how favorable the image will be viewed when presented to end users). For example, a performance metric (e.g., a numerical value) can be determined by the system 408 from data representing for each input image (e.g., the thirty-eight attributes) and how that input data reflects upon the imagery, data, etc. used to train the system 408. Upon determining performance metric for each input image of the collection 700, the image machine learning system 408 produces an output 702 that represents a comparison of the performance metrics. In this illustrated example, a listing of the input images is provided as the output 702. The listing starts with the image having the higher determined performance metric (i.e., "Image 2") and progresses to the image with the relatively lower performance metric (i.e., "Image N") of the input image collection 700. Other types of output may also be provided by the image machine learning system 408; for example, the individual performance metrics for each input image may be output.

Upon obtaining the output 702, which provides a performance measure of each input image, additional processing may be performed; for example, to identify which image or images are appropriate for publication. In general, images identified as having a good performance measure are typically more likely to be recommended (e.g., to a brand marketer) for publishing compared to images identified with poor performance metrics. From the listing of ranked images (presented in output 702), a subset of images can be identified to recommend for possible publication. For example, one or more thresholds may be defined for determining which performance metrics would be indicative of images that should be recommended for publication. A fixed number of top performers may be selected in another arrangement; for example, images having the top three performance metrics may be selected for recommendation for publication. In this illustrated example, the image having the top two largest performance metrics (e.g., Image 2 and Image 1) can be selected for recommendation to the brand marketer 304.

Along with providing recommendations from the output 702, other operations may be executed based upon the performance metrics assigned to each image. For example, performance metrics may assist in determining which images should be used as possible feedback to the image machine learning system 408 for further training. In one arrangement, images recommended for publication can be used for further training of the system 408. Attributes that represent these recommended images can be provided to the system 408 along with additional data such as interaction data (with end users) and transactional data (e.g., purchase data) that can be collected after the images are published by the brand marketer. By training the system 408 with top performing images, the system 408 can become more in tune to identifying similar images (e.g., other potential top performers). In a similar manner, images predicted as underperforming (compared to predicted top performers) may be used to further train the image machine learning system 408 to identify potentially poor performing images. One or more techniques may be employed to assist the image machine learning system 408 in identifying positive feedback (e.g., data representing top performing images) and negative feedback (e.g., data representing poor performing images); for example one more weighting techniques may be employ to highlight some feedback and reduce the effects of other feedback.

Figure 8:
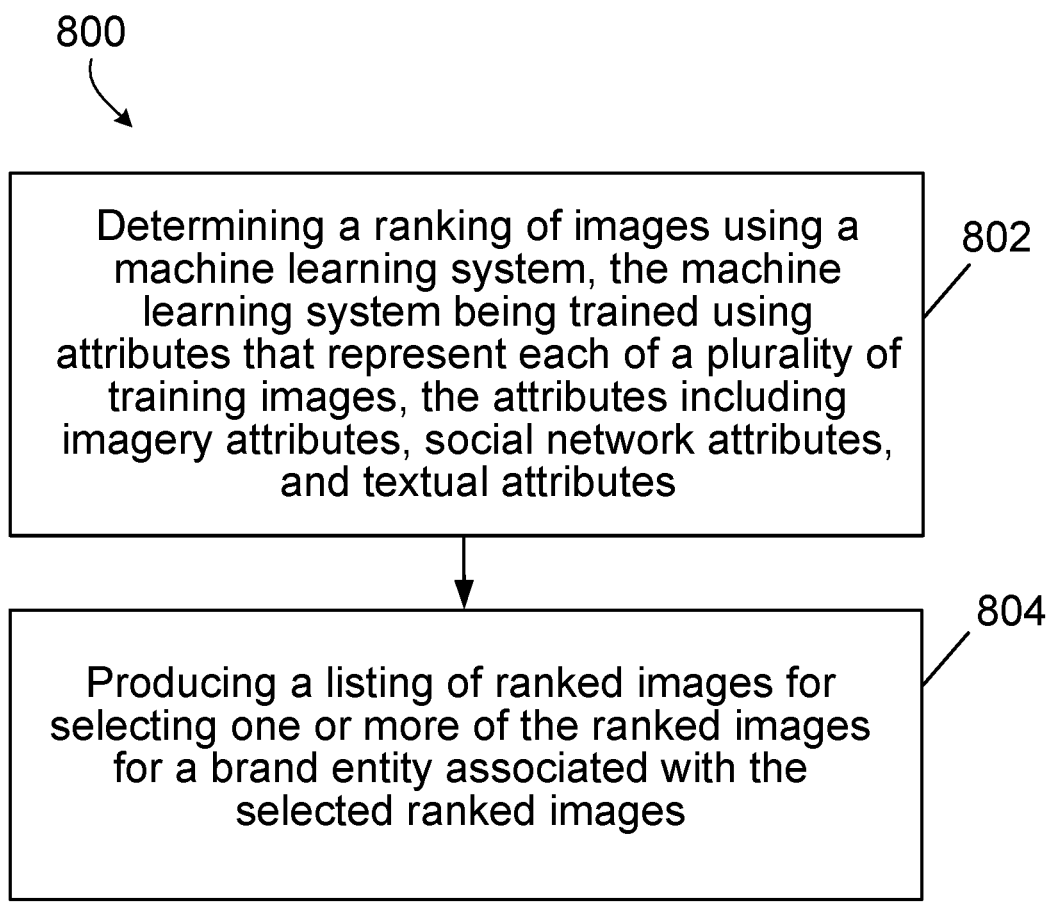
FIG. 8 is a flowchart of operations of an image manager.

Referring to FIG. 8, a flowchart 800 represents operations of an image manager (e.g., the image manager 316 shown in FIG. 3 and FIG. 4) being executed by a computing device (e.g., the server 318 located at the content director 302). Operations of the image manager are typically executed by a single computing device (e.g., the server 318); however, operations may be executed by multiple computing devices. Along with being executed at a single site (e.g., the content director 302), the execution of operations may be distributed among two or more locations. For example, a portion of the operations may be executed at a location external to the content director (e.g., the brand marketer site 304), one or more at an end user devices (e.g., the computing device 306), etc.

Operations of the image manager 316 may include determining 802 a ranking of images using a machine learning system. The machine learning system is trained using attributes that represent each of a plurality of training images. The attributes include imagery attributes, social network attributes, and textual attributes. For example, a system such as the image machine learning system 408 can be trained by images represented by thirty-eight attributes (e.g., attributes listed in FIG. 6) that reflect color properties of the images (e.g., hue, brightness, saturation, etc.), the social network source of the image, hashtags associates the image, the amount of words present in an image, etc. Operations may also include producing 804 a listing of the ranked images for selecting one or more of the ranked images for a brand entity associated with the selected ranked images. For example, as shown in FIG. 7 images input into the trained machine learning system are used to produce a ranking of the images that reflect the predicted performance of the corresponding image when published. For example, the trained machine learning system may predict that images containing many hashtags perform better with viewers when published. Based on this training, one or more images reflecting this condition may be ranked higher (than images absent hashtags) and are selected for providing to a brand marketer to publish the predicted-high-performer images.

Figure 9:
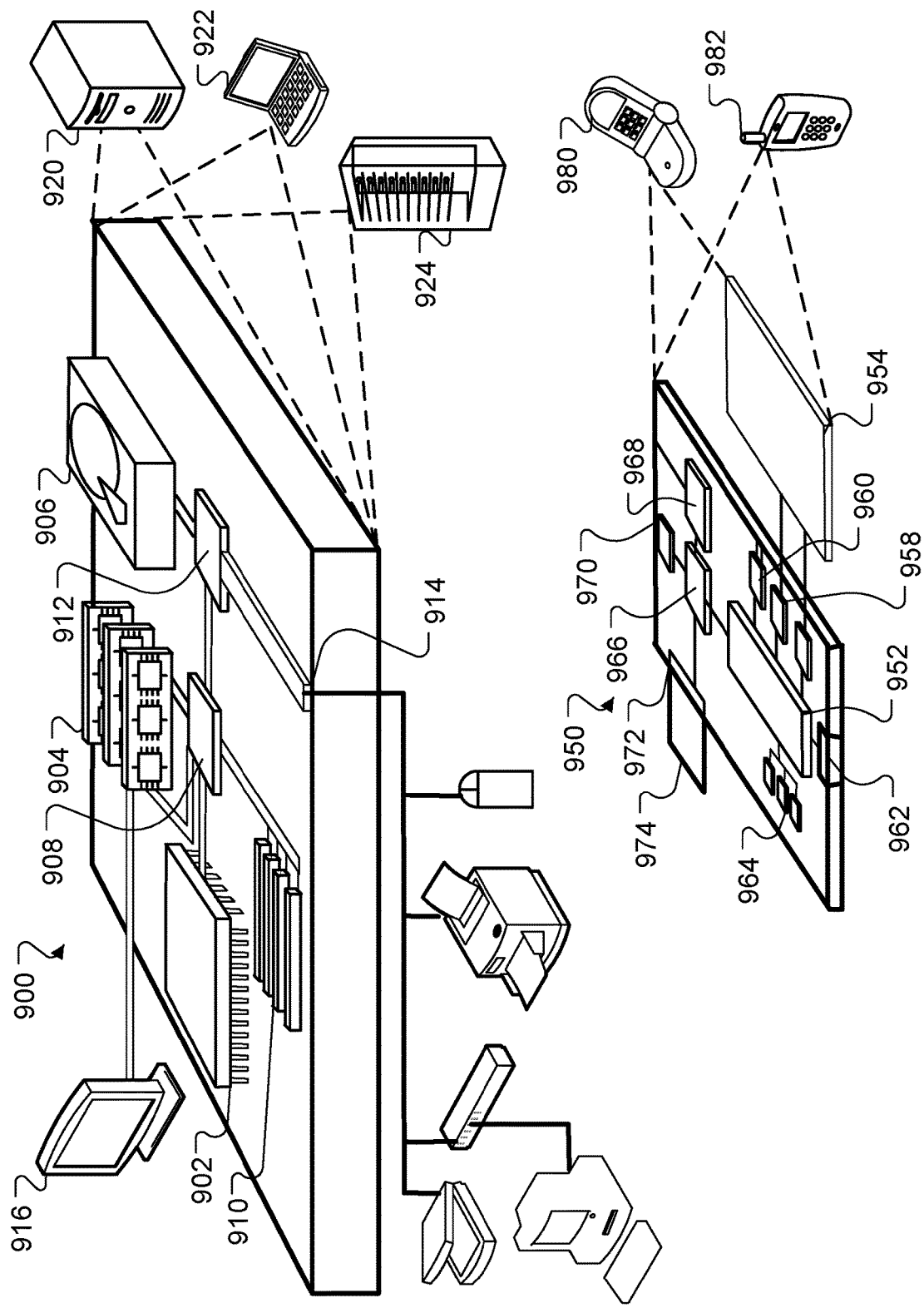
FIG. 9 illustrates an example of a computing device and a mobile computing device that can be used to implement the techniques described here.

FIG. 9 shows an example of example computing device 900 and example mobile computing device 950, which can be used to implement the techniques described herein. For example, a portion or all of the operations of image manager 316 (shown in FIG. 3) may be executed by the computing device 900 and/or the mobile computing device 950. Computing device 900 is intended to represent various forms of digital computers, including, e.g., laptops, desktops, workstations, personal digital assistants, servers, blade servers, mainframes, and other appropriate computers. Computing device 950 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 900 includes processor 902, memory 904, storage device 906, high-speed interface 908 connecting to memory 904 and high-speed expansion ports 910, and low speed interface 912 connecting to low speed bus 914 and storage device 906. Each of components 902, 904, 906, 908, 910, and 912, are interconnected using various busses, and can be mounted on a common motherboard or in other manners as appropriate. Processor 902 can process instructions for execution within computing device 900, including instructions stored in memory 904 or on storage device 906 to display graphical data for a GUI on an external input/output device, including, e.g., display 916 coupled to high speed interface 908. In other implementations, multiple processors and/or multiple busses can be used, as appropriate, along with multiple memories and types of memory. Also, multiple computing devices 900 can be connected, with each device providing portions of the necessary operations (e.g., as a server bank, a group of blade servers, or a multi-processor system).

Memory 904 stores data within computing device 900. In one implementation, memory 904 is a volatile memory unit or units. In another implementation, memory 904 is a non-volatile memory unit or units. Memory 904 also can be another form of computer-readable medium (e.g., a magnetic or optical disk. Memory 904 may be non-transitory.)

Storage device 906 is capable of providing mass storage for computing device 900. In one implementation, storage device 906 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 904, storage device 906, memory on processor 902, and the like.)

High-speed controller 908 manages bandwidth-intensive operations for computing device 900, while low speed controller 912 manages lower bandwidth-intensive operations. Such allocation of functions is an example only. In one implementation, high-speed controller 908 is coupled to memory 904, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 900 can be implemented in a number of different forms, as shown in the figure. For example, it can be implemented as standard server 920, or multiple times in a group of such servers. It also can be implemented as part of rack server system 924. In addition or as an alternative, it can be implemented in a personal computer (e.g., laptop computer 922.) In some examples, components from computing device 900 can be combined with other components in a mobile device (not shown), e.g., device 950. Each of such devices can contain one or more of computing device 900, 950, and an entire system can be made up of multiple computing devices 900, 950 communicating with each other.

Computing device 950 includes processor 952, memory 964, an input/output device (e.g., display 954, communication interface 966, and transceiver 968) among other components. Device 950 also can be provided with a storage device, (e.g., a microdrive or other device) to provide additional storage. Each of components 950, 952, 964, 954, 966, and 968, are interconnected using various buses, and several of the components can be mounted on a common motherboard or in other manners as appropriate.

Processor 952 can execute instructions within computing device 950, including instructions stored in memory 964. The processor can be implemented as a chipset of chips that include separate and multiple analog and digital processors. The processor can provide, for example, for coordination of the other components of device 950, e.g., control of user interfaces, applications run by device 950, and wireless communication by device 950.

Processor 952 can communicate with a user through control interface 958 and display interface 956 coupled to display 954. Display 954 can be, for example, a TFT LCD (Thin-Film-Transistor Liquid Crystal Display) or an OLED (Organic Light Emitting Diode) display, or other appropriate display technology. Display interface 956 can comprise appropriate circuitry for driving display 954 to present graphical and other data to a user. Control interface 958 can receive commands from a user and convert them for submission to processor 952. In addition, external interface 962 can communicate with processor 942, so as to enable near area communication of device 950 with other devices. External interface 962 can provide, for example, for wired communication in some implementations, or for wireless communication in other implementations, and multiple interfaces also can be used.

Memory 964 stores data within computing device 950. Memory 964 can be implemented as one or more of a computer-readable medium or media, a volatile memory unit or units, or a non-volatile memory unit or units. Expansion memory 974 also can be provided and connected to device 950 through expansion interface 972, which can include, for example, a SIMM (Single In Line Memory Module) card interface. Such expansion memory 974 can provide extra storage space for device 950, or also can store applications or other data for device 950. Specifically, expansion memory 974 can include instructions to carry out or supplement the processes described above, and can include secure data also. Thus, for example, expansion memory 974 can be provided as a security module for device 950, and can be programmed with instructions that permit secure use of device 950. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 964, expansion memory 974, and/or memory on processor 952), which can be received, for example, over transceiver 968 or external interface 962.

Device 850 can communicate wirelessly through communication interface 966, which can include digital signal processing circuitry where necessary. Communication interface 966 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 968. In addition, short-range communication can occur, e.g., using a Bluetooth®, WiFi, or other such transceiver (not shown). In addition, GPS (Global Positioning System) receiver module 970 can provide additional navigation- and location-related wireless data to device 950, which can be used as appropriate by applications running on device 950. Sensors and modules such as cameras, microphones, compasses, accelerators (for orientation sensing), etc. may be included in the device.

Device 950 also can communicate audibly using audio codec 960, which can receive spoken data from a user and convert it to usable digital data. Audio codec 960 can likewise generate audible sound for a user, (e.g., through a speaker in a handset of device 950.) Such sound can include sound from voice telephone calls, can include recorded sound (e.g., voice messages, music files, and the like) and also can include sound generated by applications operating on device 950.

Computing device 950 can be implemented in a number of different forms, as shown in the figure. For example, it can be implemented as cellular telephone 980. It also can be implemented as part of smartphone 982, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
   (a) determining a ranking of images associated with a brand entity for presentation to one or more customers of the brand entity, wherein the determination of the ranking comprises: (i) using a machine learning system, the machine learning system being trained using attributes that represent each of a plurality of training images filtered to remove off-brand entity images, the attributes including previously known consumer of the brand entity attributes, imagery attributes, Internet-based social network attributes, and textual attributes of textual content included in the plurality of training images, Internet-based social network attributes comprising a number of hashtags or a similarity of hashtags present in one or more image captions; (ii) inputting a plurality of potential images for presentation to the trained machine learning system; and (iii) ranking the inputted potential images based on a similarity between inputted potential images and a plurality of guidelines associated with the brand entity to create a listing of ranked images; and
   (b) producing the listing of the ranked images to one or more service providers associated with the brand entity for selecting one or more of the ranked images for the brand entity associated with the selected ranked images, wherein the one or more service providers comprises designers or marketers of the brand entity.

2. The computing device implemented method of claim 1, further comprising: further training of the machine learning system using data associated with the ranked images.

3. The computing device implemented method of claim 2, wherein the data associated with the ranked images represents user interactions with a subset of the ranked images.

4. The computing device implemented method of claim 2, wherein the data associated with the ranked images represents transactions with a subset of the ranked images.

5. The computing device implemented method of claim 1, wherein the imagery attributes represent one or more colors included in a corresponding image of the plurality of training images.

6. The computing device implemented method of claim 1, wherein the textual attributes represent a count of words present in a corresponding image of the plurality of training images.

7. The computing device implemented method of claim 1, wherein the textual attributes represent a count of characters present in a corresponding image of the plurality of training images.

8. The computing device implemented method of claim 1, wherein the Internet-based social network attributes include a count of positive indications from social network users.

9. The computing device implemented method of claim 1, wherein the Internet-based social network attributes include a count of topic-identifying text.

10. The computing device implemented method of claim 1, wherein the attributes represent the geographical source of a corresponding image of the plurality of training images.

11. The computing device implemented method of claim 1, wherein the attributes represent wearable items present in a corresponding image of the plurality of training images.

12. A system comprising:
    a computing device comprising:
       a memory configured to store instructions; and a processor to execute the instructions to perform operations comprising:
          (a) determining a ranking of images associated with a brand entity for presentation to one or more viewers, wherein the determination of the ranking comprises: (i) using a machine learning system, the machine learning system being trained using attributes that represent each of a plurality of training images filtered to remove off-brand entity images, the attributes including previously known consumer of the brand entity attributes, imagery attributes, Internet-based social network attributes, and textual attributes of textual content included in the plurality of training images, Internet-based social network attributes comprising a number of hashtags or a similarity of hashtags present in one or more image captions; (ii) inputting a plurality of potential images for presentation to the trained machine learning system; and (iii) ranking the inputted potential images based on a similarity between inputted potential images and a plurality of guidelines associated with the brand entity to create a listing of ranked images; and
          (b) producing the listing of the ranked images to one or more service providers for selecting one or more of the ranked images for the brand entity associated with the selected ranked images, wherein the one or more service providers comprises designers or marketers associated with the brand entity.

13. The system of claim 12, wherein operations further comprise:
    further training of the machine learning system using data associated with the ranked images.

14. The system of claim 13, wherein the data associated with the ranked images represents user interactions with a subset of the ranked images.

15. The system of claim 13, wherein the data associated with the ranked images represents transactions with a subset of the ranked images.

16. The system of claim 12, wherein the imagery attributes represent one or more colors included in a corresponding image of the plurality of training images.

17. The system of claim 12, wherein the textual attributes represent a count of words present in a corresponding image of the plurality of training images.

18. The system of claim 12, wherein the textual attributes represent a count of characters present in a corresponding image of the plurality of training images.

19. The system of claim 12, wherein the Internet-based social network attributes include a count of positive indications from social network users.

20. The system of claim 12, wherein the Internet-based social network attributes include a count of topic-identifying text.

21. The system of claim 12, wherein the attributes represent the geographical source of a corresponding image of the plurality of training images.

22. The system of claim 13, wherein the attributes represent wearable items present in a corresponding image of the plurality of training images.

23. One or more non-transitory computer readable media storing instructions that are executable by a processing device, and upon such execution cause the processing device to perform operations comprising:
(a) determining a ranking of images associated with a brand entity for presentation to one or more viewers, wherein the determination of the ranking comprises: (i) using a machine learning system, the machine learning system being trained using attributes that represent each of a plurality of training images filtered to remove off-brand entity images, the attributes including previously known consumer of the brand entity attributes, imagery attributes, Internet-based social network attributes, and textual attributes of textual content included in the plurality of training images, Internet-based social network attributes comprising a number of hashtags or a similarity of hashtags present in one or more image captions; (ii) inputting a plurality of potential images for presentation to the trained machine learning system; and (iii) ranking the inputted potential images based on a similarity between inputted potential images and a plurality of guidelines associated with the brand entity to create a listing of ranked images; and
(b) producing the listing of the ranked images to one or more service providers associated with the brand entity for selecting one or more of the ranked images for the brand entity associated with the selected ranked images, wherein the one or more service providers comprises designers or marketers associated with the brand entity.

24. The non-transitory computer readable media of claim 23, operations further comprising:
further training of the machine learning system using data associated with the ranked images.

25. The non-transitory computer readable media of claim 24, wherein the data associated with the ranked images represents user interactions with a subset of the ranked images.

26. The non-transitory computer readable media of claim 24, wherein the data associated with the ranked images represents transactions with a subset of the ranked images.

27. The non-transitory computer readable media of claim 23, wherein the imagery attributes represent one or more colors included in a corresponding image of the plurality of training images.

28. The non-transitory computer readable media of claim 23, wherein the textual attributes represent a count of words present in a corresponding image of the plurality of training images.

29. The non-transitory computer readable media of claim 23, wherein the textual attributes represent a count of characters present in a corresponding image of the plurality of training images.

30. The non-transitory computer readable media of claim 23, wherein the Internet-based social network attributes include a count of positive indications from social network users.

31. The non-transitory computer readable media of claim 23, wherein the Internet-based social network attributes include a count of topic-identifying text.

32. The non-transitory computer readable media of claim 23, wherein the attributes represent the geographical source of a corresponding image of the plurality of training images.

33. The non-transitory computer readable media of claim 23, wherein the attributes represent wearable items present in a corresponding image of the plurality of training images.

* * * * *